United States Patent
Yoon et al.

(10) Patent No.: US 9,582,181 B2
(45) Date of Patent: Feb. 28, 2017

(54) METHOD AND APPARATUS FOR UNLOCKING LOCK SCREEN IN ELECTRONIC DEVICE

(71) Applicant: Samsung Electronics Co., Ltd., Gyeonggi-do (KR)

(72) Inventors: Piljoo Yoon, Gyeonggi-do (KR); Yongjoon Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 14 days.

(21) Appl. No.: 14/455,579

(22) Filed: Aug. 8, 2014

(65) Prior Publication Data

US 2015/0047014 A1   Feb. 12, 2015

(30) Foreign Application Priority Data

Aug. 8, 2013  (KR) .................. 10-2013-0094073

(51) Int. Cl.
| | |
|---|---|
| *G06F 21/00* | (2013.01) |
| *G06F 3/0488* | (2013.01) |
| *G06F 3/0481* | (2013.01) |
| *G06F 3/01* | (2006.01) |
| *G06F 3/0486* | (2013.01) |

(Continued)

(52) U.S. Cl.
CPC ............ *G06F 3/0488* (2013.01); *G06F 3/017* (2013.01); *G06F 3/0481* (2013.01); *G06F 3/0486* (2013.01); *G06F 3/04883* (2013.01); *G06F 21/36* (2013.01); *G06F 21/629* (2013.01); *H04M 1/67* (2013.01); *G06F 2221/2137* (2013.01); *H04M 2250/22* (2013.01)

(58) Field of Classification Search
CPC ...... G06F 21/629; G06F 21/32; G06F 3/0488; G06F 3/0481; G06F 3/017; G06F 3/0486; G06F 3/04883; G06F 21/36; G06F 2221/2137; H04M 1/67; H04M 2250/22
See application file for complete search history.

(56) References Cited

U.S. PATENT DOCUMENTS 8,694,791 B1 * 4/2014 Rohrweck ............... G06F 21/36
                                                                     455/418
9,224,029 B2 * 12/2015 Setlak ................ G06K 9/00013

(Continued)

FOREIGN PATENT DOCUMENTS

| | | |
|---|---|---|
| GB | 2486706 | 6/2012 |
| JP | 2972979 | 9/1999 |

(Continued)

OTHER PUBLICATIONS

European Search Report dated Apr. 24, 2015 issued in counterpart application No. 14180210.8-1972.

*Primary Examiner* — Don Zhao
(74) *Attorney, Agent, or Firm* — The Farrell Law Firm, P.C.

(57) ABSTRACT

A method and apparatus for unlocking a lock screen in an electronic device are provided. A method for unlocking a lock screen in an electronic device includes displaying a lock screen in which objects of the On and Off state have been randomly disposed, detecting a gesture for unlocking the lock screen, determining whether or not a first unlocking value generated in response to the gesture is identical with a predetermined second unlocking value, and unlocking the lock screen if the first unlocking value is identical with the second unlocking value.

15 Claims, 10 Drawing Sheets

(51) Int. Cl.
*G06F 21/62* (2013.01)
*G06F 21/36* (2013.01)
*H04M 1/67* (2006.01)

(56) References Cited

U.S. PATENT DOCUMENTS

| | | | |
|---|---|---|---|
| 2007/0150842 A1 | 6/2007 | Chaudhri et al. | |
| 2009/0036100 A1 | 2/2009 | Lee | |
| 2011/0041102 A1* | 2/2011 | Kim | 715/863 |
| 2011/0090097 A1* | 4/2011 | Beshke | B60R 25/23 341/20 |
| 2011/0138444 A1* | 6/2011 | Kang et al. | 726/3 |
| 2012/0102437 A1* | 4/2012 | Worley | G06F 3/04883 715/863 |
| 2012/0117643 A1* | 5/2012 | Orr | 726/19 |
| 2012/0235912 A1* | 9/2012 | Laubach | G06F 3/04895 345/163 |
| 2012/0258773 A1* | 10/2012 | Alvarez Rivera | G06F 1/1656 455/556.1 |
| 2012/0284674 A1* | 11/2012 | Geng et al. | 715/863 |
| 2012/0327009 A1* | 12/2012 | Fleizach | G06F 3/04883 345/173 |
| 2013/0094770 A1 | 4/2013 | Lee et al. | |
| 2013/0169573 A1* | 7/2013 | Nishio | G06F 3/04883 345/173 |
| 2013/0174094 A1* | 7/2013 | Heo et al. | 715/835 |
| 2013/0234971 A1* | 9/2013 | Li | 345/173 |
| 2013/0239065 A1* | 9/2013 | Lindberg | G06F 3/04817 715/846 |
| 2013/0265250 A1* | 10/2013 | Ishikawa | G06F 3/041 345/173 |
| 2013/0346921 A1* | 12/2013 | Shiplacoff et al. | 715/835 |
| 2014/0028611 A1* | 1/2014 | Chen | G06F 3/044 345/174 |
| 2014/0040035 A1* | 2/2014 | Cusack | G06Q 30/02 705/14.61 |
| 2014/0109010 A1* | 4/2014 | Casey | G06F 21/31 715/835 |
| 2014/0109217 A1* | 4/2014 | Park | 726/17 |
| 2014/0109219 A1* | 4/2014 | Rohrweck | G06F 21/36 726/19 |
| 2014/0137045 A1* | 5/2014 | Ding | 715/835 |
| 2014/0289843 A1 | 9/2014 | Chiang | |
| 2014/0365974 A1 | 12/2014 | Sohn et al. | |

FOREIGN PATENT DOCUMENTS

| | | |
|---|---|---|
| KR | 1020080079333 | 8/2008 |
| WO | WO 2013/082958 | 6/2013 |
| WO | WO 2013/094910 | 6/2013 |

* cited by examiner

METHOD AND APPARATUS FOR UNLOCKING LOCK SCREEN IN ELECTRONIC DEVICE

PRIORITY

This application claims the priority under 35 U.S.C. §119(a) to a Korean Patent Application filed on Aug. 8, 2013 in the Korean Intellectual Property Office and assigned Serial No. 10-2013-0094073, the entire contents of which are incorporated herein by reference.

BACKGROUND

1. Field of the Invention

The present disclosure generally relates to a method and apparatus capable of unlocking a lock screen in an electronic device.

2. Description of the Related Art

With the development of digital technology, electronic devices, such as smart phones and tablet Personal Computers (PCs), are commonly used. The electronic device provides convenience by providing various functions, such as the photographing and playback of photos or videos, gaming, document and e-mail writing functions, and the Internet.

The electronic device can provide a function of storing personal information or information related to business which may not be public to other users, of the various functions. The electronic device supports a screen lock function so that users can protect their personal information and information related to business that are stored in the electronic device as described above.

Furthermore, the electronic device provides various unlocking methods, such as a pattern lock and a password lock, as a method for unlocking a locked screen.

The conventional method of unlocking a pattern lock or a password lock includes displaying a pattern input window and a password input window and performing unlocking using a specific pattern input to the displayed input window. Such a pattern input and password input are likely to be exposed to surrounding people. That is, the unlocking method using the pattern lock method is disadvantageous in that people other than a user may easily unlock a lock screen using a corresponding pattern.

SUMMARY

The present invention has been made to address the above problems and disadvantages, and to provide at least the advantages described below. Accordingly, an aspect of the present invention provides a method and apparatus for processing a lock screen in an electronic device in an environment in which the security of an electronic device is enhanced by supporting the unlocking of a lock screen through gesture inputs having various patterns.

In accordance with an aspect of the present invention, a method of unlocking a lock screen in an electronic device includes displaying a lock screen in which objects of an On and Off state are randomly disposed, detecting a gesture for unlocking the lock screen, determining whether or not a first unlocking value generated in response to the gesture is identical with a predetermined second unlocking value, and unlocking the lock screen if the first unlocking value is identical with the second unlocking value.

In accordance with another aspect of the present invention, a method for processing a lock screen in an electronic device includes detecting a user input, analyzing state information in response to the user input, displaying a lock screen in which objects of an On and Off state are controlled based on the analyzed state information, detecting a gesture for unlocking the lock screen, determining if a first unlocking value generated in response to the gesture is identical with a predetermined second unlocking value, and unlocking the lock screen if the first unlocking value is identical with the second unlocking value.

In accordance with yet another aspect of the present invention, an apparatus for processing a lock screen in an electronic device includes a touch screen configured to display a lock screen in which objects of an On and Off state are randomly disposed, and to detect a gesture for unlocking the lock screen, and a control unit configured to control the touch screen so that the lock screen in which the objects of the On and Off state are randomly disposed is displayed on the touch screen, to detect a gesture for unlocking the lock screen, to determine if a first unlocking value generated in response to the gesture is identical with a predetermined second unlocking value, and to unlock the lock screen if the first unlocking value is identical with the predetermined second unlocking value.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. It is to be noted that the same reference numbers are used throughout the drawings to refer to the same elements. Furthermore, a detailed description of known functions or constructions that may make the gist of the present invention vague is omitted.

The embodiments of the present invention disclosed in the specification and drawings have been illustrated to present only specific examples in order to clarify the technical contents of the present invention and facilitate understanding of the present invention, but are not intended to limit the scope of the present invention. It will be evident to those skilled in the art that various implementations based on the technical spirit of the present invention are possible in addition to the disclosed embodiments.

An electronic device according to the present invention may be a mobile communication terminal, a smart phone, a tablet Personnel Computer (PC), a hand-held PC, a Portable Multimedia Player (PMP), a Personal Digital Assistant (PDA), a notebook PC, and the like.

Figure 1:
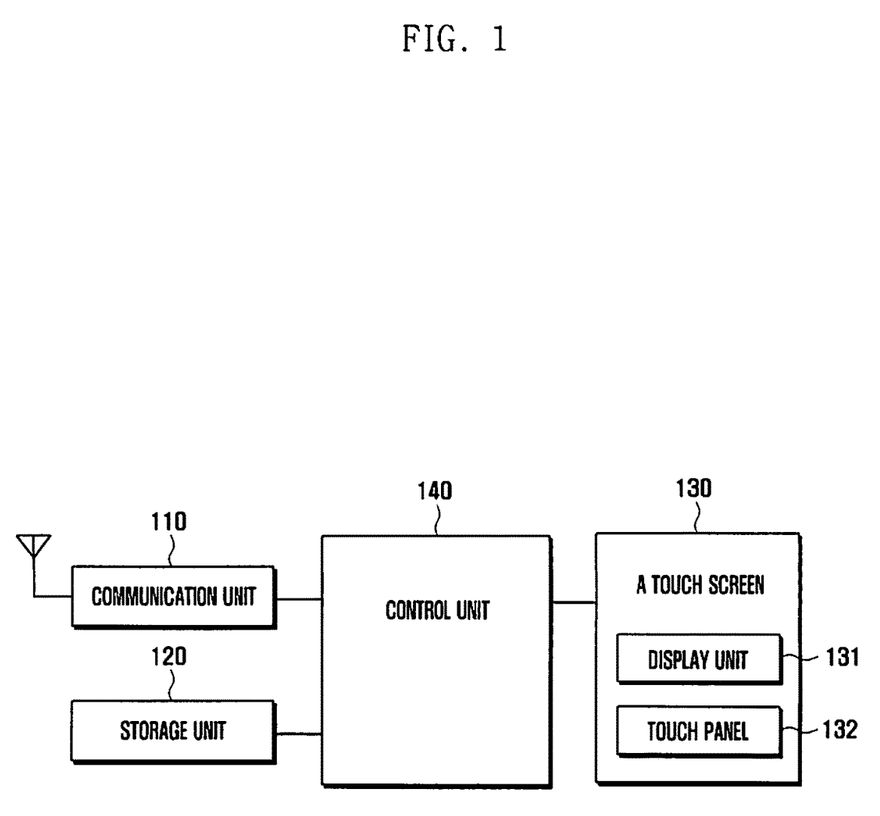
FIG. 1 is a block diagram illustrating the construction of an electronic device in accordance with an embodiment of the present invention.

FIG. 1 is a block diagram illustrating an electronic device in accordance with an embodiment of the present invention.

Referring to FIG. 1, the electronic device of the present invention includes a communication unit 110, a storage unit 120, a touch screen 130, and a control unit 140.

The communication unit 110 performs voice calls, video telephony, and data communication with external devices over a network. The communication unit 110 includes a Radio Frequency (RF) transmitter for performing up-conversion and amplification on the frequency of a transmitted signal and an RF receiver for performing low-noise amplification on a received signal and down-conversion on the frequency of the signal. The communication unit 110 further includes a modulator and a demodulator. The modulator and the demodulator includes CDMA, WCDMA, LTE, Wi-Fi, WIBRO, Bluetooth, and NFC. The communication unit 110 is either a mobile communication module, an Internet communication module, a short-distance communication module, or any combination thereof.

The storage unit 120 includes program memory for storing the operating program of the electronic device and data memory for storing data generated when executing programs. In an embodiment of the present invention, the storage unit 120 stores an unlocking value set to unlock a lock screen.

The touch screen 130 includes a display unit 131 and a touch panel 132. The display unit 131 displays various types of screens according to the use of the electronic device under the control of the control unit 140. The display unit 131 includes a Liquid Crystal Display (LCD), Organic Light Emitted Diodes (OLEDs), or Active Matrix Organic Light Emitted Diodes (AMOLEDs). The touch panel 132 includes a complex touch panel with a hand touch panel configured to detect hand gestures and a pen touch panel for detecting pen gestures.

In a particular embodiment of the present invention, the display unit 131 displays a lock screen under the control of the control unit 140. In an embodiment of the present invention, the lock screen includes a plurality of objects. In an embodiment of the present invention, the plurality of objects are disposed in a different shape (or pattern) whenever the objects are displayed in response to a request from a user. Furthermore, the touch panel 132 detects a gesture for unlocking in the displayed lock screen under the control of the control unit 140. In response to the detected gesture, the display unit 131 displays the lock screen by applying a visual effect (e.g., the toggling of each object (object brightness on/off effects)) to the objects where the gesture was generated. Furthermore, if a predetermined unlocking value is not identical with an unlocking value generated by the gesture, the display unit 131 displays an error message indicative of the generation of an error under the control of the control unit 140.

The control unit 140 controls the overall operation of the electronic device and a signal flow between the internal elements of the electronic device, functions for processing data, and controls the supply of power from a battery to the internal elements.

In a particular embodiment of the present invention, the control unit 140 controls the display unit 131 so that a lock screen in which objects of the On state and objects of the Off state have been randomly generated (or combined) is displayed on the display unit 131. The control unit 140 detects a gesture for unlocking a lock screen through the touch panel 132 in the lock screen. In this case, when a gesture is detected in an object of the On state, the object of the On state is changed into the object of the Off state. When a gesture is detected in an object of the Off state, the object of the Off state is changed into the object of the On state. Furthermore, when the completion of the gesture input is detected, the control unit 140 may recognizes an unlocking value (e.g., a pattern generated based on an object of the On state or a pattern generated based on an object of the Off state) generated based on an object whose On or Off state has been changed in response to the gesture. Furthermore, the control unit 140 determines whether or not a predetermined unlocking value is identical with the unlocking value generated in response to the gesture. If, as a result of the determination, it is determined that the predetermined unlocking value is identical with the unlocking value generated in response to the gesture, the control unit 140 unlocks the lock screen. In contrast, if, as a result of the determination, it is determined that the predetermined unlocking value is not identical with the unlocking value generated in response to the gesture, the control unit 140 controls the display unit 131 so that an error message is displayed on the display unit 131. Furthermore, the control unit 140 analyzes information about the state of the electronic device and controls the display unit 131 so that objects of the On state and objects of the Off state are controlled (e.g., control of a level of complexity and control of a level of difficulty) and displayed on the display unit 131.

The electronic device may further include elements having supplementary functions, such as a Global Positioning System (GPS) module for receiving location information, an audio processing unit including a microphone and a speaker, a camera module for capturing a still image and moving image of a subject for photographing, and an input unit for input support based on a hard key, selectively, but a description and figures of the elements are omitted.

Figure 2:
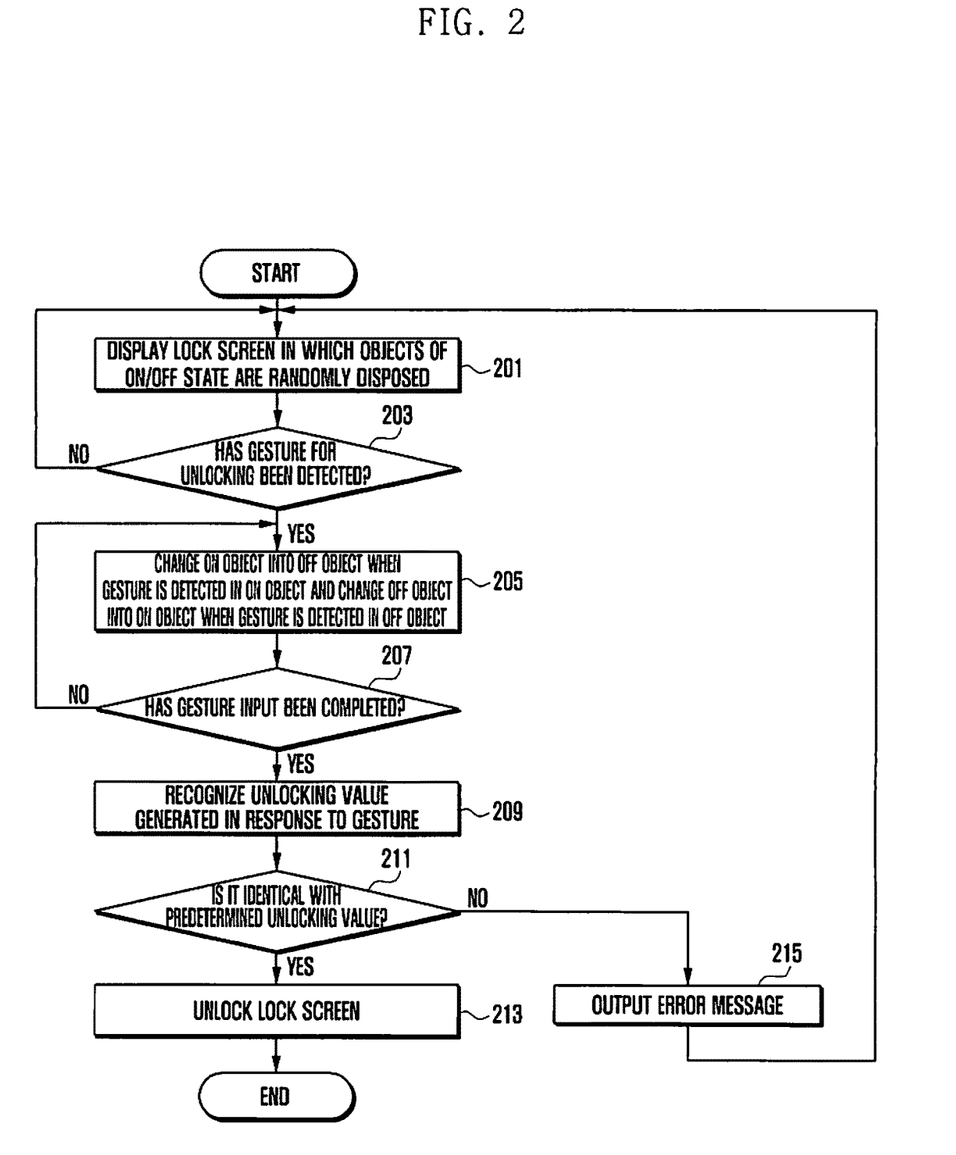
FIG. 2 is a flowchart illustrating a method of processing a lock screen in accordance with an embodiment of the present invention.
Figure 3A:
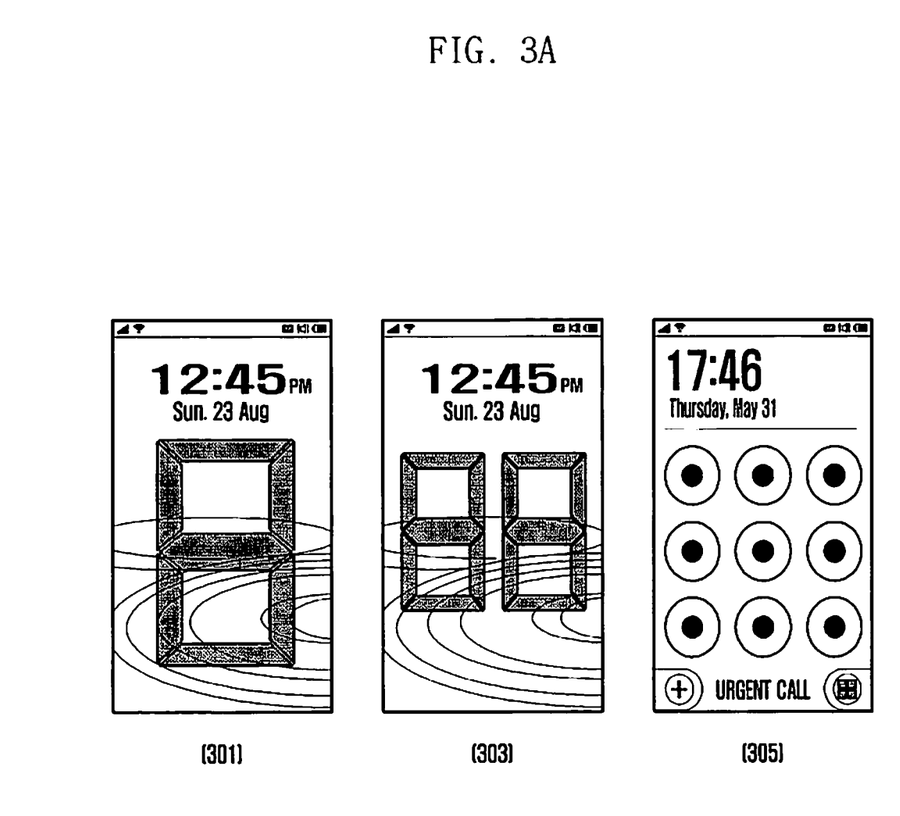
FIGS. 3A to 3C are exemplary diagrams of screens which may be displayed as lock screens.
Figure 3B:
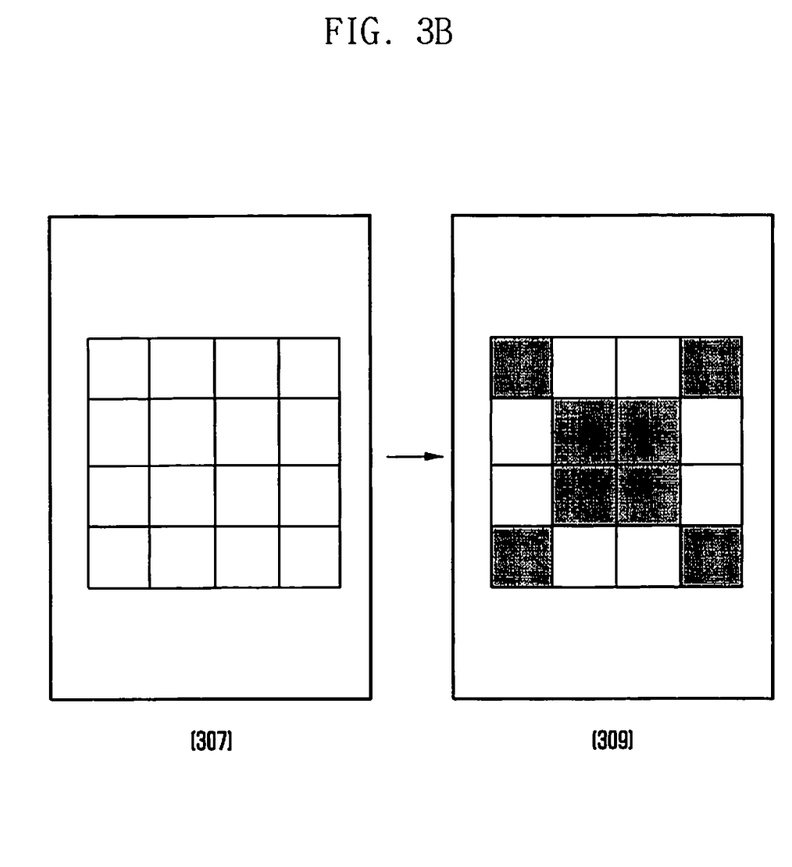
Figure 3C:
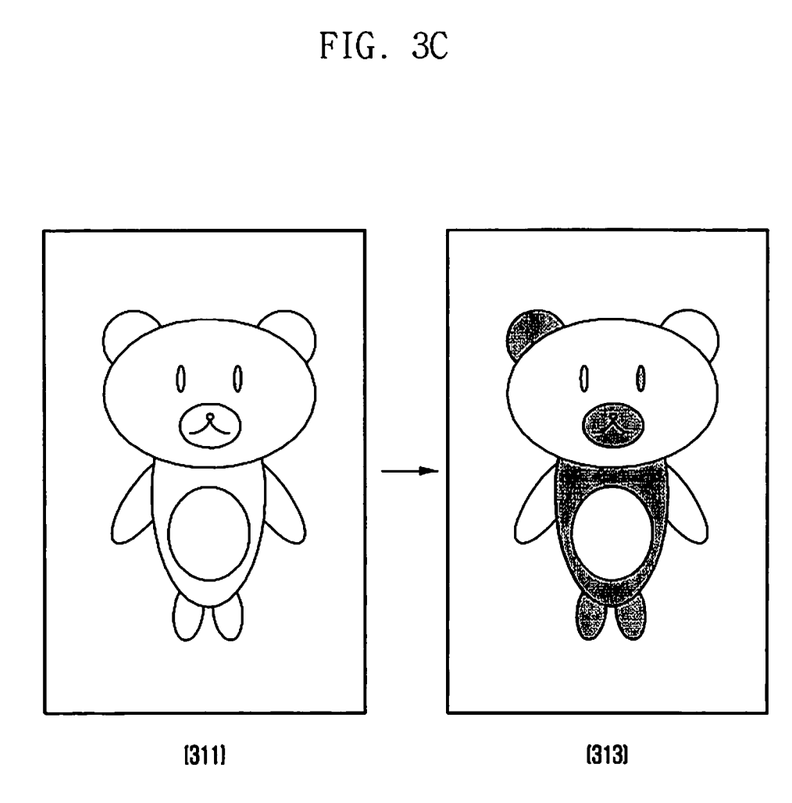

FIG. 2 is a flowchart illustrating a method of processing a lock screen in accordance with an embodiment of the present invention, and FIGS. 3A to 3C are diagrams of screens which may be displayed as lock screens.

Referring to FIGS. 2 to 3C, at step 201, the control unit 140 in accordance with an embodiment of the present invention controls the display unit 131 so that a lock screen is displayed on the display unit 131. For example, the lock screen is displayed when a hard key (e.g., a home key or a volume key) is entered in the state in which the display unit 131 is in the Off state.

In this case, a 7-segment of a single digit as shown in 301 of FIG. 3A, a 7-segment of two digits as shown in 303 of FIG. 3A, a specific shape as shown in 305 of FIG. 3A, or an image stored in a gallery or a background screen image of the electronic device as shown in 307 of FIG. 3B and/or as shown in 311 of FIG. 3C may be displayed as the lock screen, but the present invention is not limited thereto. In this case, the image includes a figure formed of a plurality of looped curves.

More particularly, an image in which objects of the On state and objects of the Off state have been randomly generated as shown in 309 of FIG. 3B based on a figure formed by a plurality of looped curves as shown in 307 of FIG. 3B may be displayed as the lock screen. Alternatively, an image in which objects of the On state and objects of the Off state have been randomly generated as shown in 313 of FIG. 3C based on an image formed of a plurality of looped curves as shown in 311 of FIG. 3C may be displayed as the lock screen.

Hereinafter, an example in which the lock screen in accordance with an embodiment of the present invention is displayed as a 7-segment of two digits (refer to 303 of FIG. 3A) and is described below.

The lock screen includes a plurality of objects and is a screen in which objects of the On state and objects of the Off state are randomly disposed. In this case, the object of the On state are displayed differently from the object of the Off state based on color and/or light and shade. Furthermore, the object of the On state and the object of the Off state may not be displayed in the same shape every time. For example, when the electronic device switches from an idle state (e.g., when the display unit 131 switches from the Off state) to the On state or if a predetermined unlocking value is not identical with an unlocking value generated in response to a gesture, a lock screen in which the objects of the On state and the objects of the Off state have been randomly disposed again may be displayed on the display unit 131.

At step 203, the control unit 140 determines whether or not a gesture for unlocking the lock screen has been detected in the lock screen displayed on the display unit 131. The gesture is a gesture for making an unlocking value, set by a user, identical with a shape of objects (e.g., a shape of objects of the On state that belong to objects of a 7-segment) displayed as the lock screen. In accordance with one embodiment of the present invention, if an unlocking value set by a user using the 7-segment has the shape of a number "3", the user may change the state of some of the objects of the 7-segment into the On or Off state so that the 7-segment has the shape of the number "3" through a gesture (e.g., tap on each of the objects or drawing that passes through the objects) input for toggling the On or Off state of objects of the 7-segment. The gesture in accordance with an embodiment of the present disclosure is assumed to be tap, drag, or tap and drag, but the present invention is not limited thereto.

If, as a result of the determination at step 203, it is determined that the gesture has been generated, the control unit 140 changes the state of an object where the gesture is detected into the On state or the Off state depending on the state of the object and displays the object at step 205. For example, when a gesture is detected in an object of the On state, the control unit 140 changes the object of the On state into the object of the Off state. When a gesture is detected in an object of the Off state, the control unit 140 changes the object of the Off state into the object of the On state.

Furthermore, when the state of the object is changed (e.g., from the On state to the Off state or from the Off state to the On state), the control unit 140 controls the display unit 131 so that the object where the gesture was detected is displayed on the display unit 131 by applying a visual effect to the object. A user may be intuitively aware that the gesture has occurred in the object through the visual effect. The visual effect includes temporally appearing and switching to the lock screen of the original state after a specific time elapses. Furthermore, the visual effect in accordance with an embodiment of the present invention includes color, light and shade, or light-emission, but the present invention is not limited thereto.

At step 207, the control unit 140 determines whether or not the gesture input has been completed. For example, if a gesture is released in the touch panel 132 and a specific time elapses or when a touch input to a confirm button provided separately from the lock screen is detected, the control unit 140 detects the lapse of the specific time or the touch input at step 207 and recognizes an unlocking value generated in response to the lapse of the specific time or the gesture (i.e., a value on which an object of the On state is changed into the object of the Off state or a value on which an object of the Off state is changed into the object of the On state or both) at operation 209. In accordance with one embodiment of the present invention, in a method of is recognizing an unlocking value based on objects of the On state, the control unit 140 extracts only objects of the On state from the objects of the lock screen and generates an unlocking value based on the extracted objects. Furthermore, in a method of recognizing an unlocking value based on objects of the Off state, the control unit 140 extracts only objects of the Off state from the objects of the lock screen and generates an unlocking value based on the extracted objects.

At step 211, the control unit 140 determines whether or not the recognized unlocking value (i.e., the unlocking value generated in response to the gesture) is identical with the predetermined unlocking value. If, as a result of the determination, it is determined that the recognized unlocking value is identical with the predetermined unlocking value, the control unit 140 unlocks the lock screen at step 213.

In contrast, if, as a result of the determination, it is determined that the recognized unlocking value is not identical with the predetermined unlocking value, the control unit 140 outputs an error message to the display unit 131 at step 215 and controls the display unit 131 so that a lock screen in which the objects of the On state have been randomly disposed again is displayed on the display unit 131.

Methods of processing a lock screen are described in detail below with reference to the diagrams of FIGS. 4 to 6.

Figure 4:
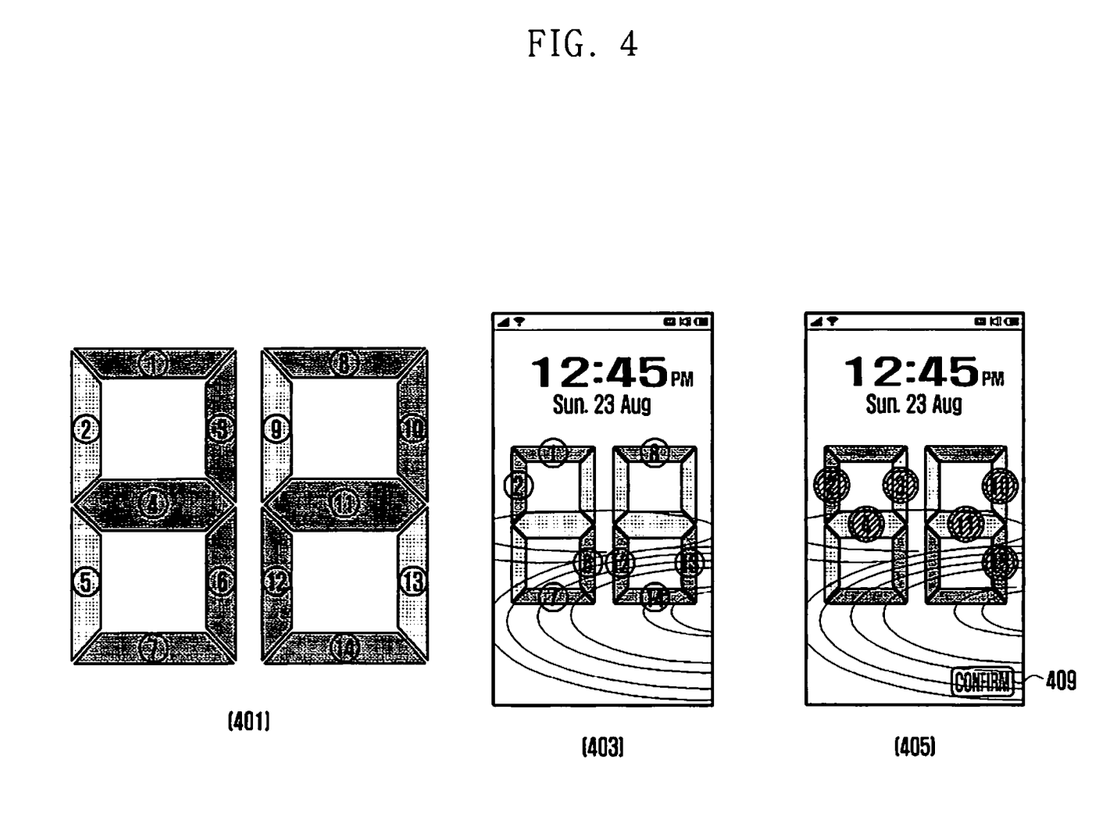
FIG. 4 is a diagram illustrating a first example of a method of processing a lock screen.

FIG. 4 is a diagram illustrating a first example of a method of processing a lock screen.

In accordance with an embodiment of the present invention, FIG. 4 shows an example of a method of processing a lock screen by inputting an unlocking value through a tap on a displayed lock screen. Furthermore, in accordance with an embodiment of the present invention, it should hereinafter be assumed that the lock screen includes a 7-segment of two digits and an unlocking value set by a user has the shape of numbers "32" (i.e., a shape formed by object Nos. 1, 3, 4, 6, 7, 8, 10, 11, 12, and 14 of the On state), as shown in 401 of FIG. 4. It is to be noted that the numbers indicated in the objects of FIG. 4 have been illustrated in order to describe the method of processing a lock screen, but the numbers are not displayed in actual implementations.

The control unit 140 controls the display unit 131 so that a lock screen formed of the 7-segment of two digits wherein objects of the On state and objects of the Off state have been randomly generated is displayed on the display unit 131, as shown in 403 of FIG. 4. Furthermore, the 7-segment of two digits includes 14 objects, and the 14 objects may be differently displayed depending on the On or Off state. Furthermore, the objects of the On or Off state are not displayed in the same shape every time. For example, when the electronic device switches from the idle state (e.g., when the display unit 131 switches from the Off state) to the On state or when a predetermined unlocking value is determined to be not identical with an unlocking value generated in response to a gesture, a lock screen in which the objects of the On state and the objects of the Off state have been randomly disposed again are displayed on the display unit 131.

The control unit 140 detects a tap input for unlocking the lock screen through the touch panel 132 in the lock screen displayed on the display unit 131, as shown in 403 of FIG. 4. When the tap input is detected in an object of the On state that is displayed on the lock screen, the control unit 140 changes the object of the On state into the object of the Off state. When the tap input is detected in an object of the Off state that is displayed on the lock screen, the control unit 140 changes the object of the Off state into the object of the On state. Furthermore, when a redundant tap input is generated in an object of the On state, the control unit 140 changes the object of the On state into the object of the On state, that is, the original state. When a redundant tap input is generated in an object of the Off state, the control unit 140 changes the object of the Off state into the object of the Off state, that is, the original state.

Furthermore, whether or not an object is an object required to generate a correct unlocking value may be determined based on the tap input. More particularly, if the tap input is detected in an object of the On state, the control unit 140 determines that the object of the On state is not an object required to generate a correct unlocking value. If the tap input is not detected in an object of the On state, the control unit 140 determines the object of the On state to be an object required to generate a correct unlocking value. If the tap input is detected in an object of the Off state, the control unit 140 determines the object of the Off state to be an object required to generate a correct unlocking value. If the tap input is not detected in an object of the Off state, the control unit 140 determines the object of the Off state to be an object not required to generate a correct unlocking value.

For example, 401 of FIG. 4 illustrates a predetermined unlocking value "32." That is, objects 2, 5, 9 and 13 are in the Off state, while objects 1, 3, 4, 6, and 7 are in the On state. The image randomly generated by the control unit 140 is illustrated in 403 of FIG. 4. That is, objects 3, 4, 5, 9, 10, and 11 are in the Off state, while objects 1, 2, 6, 7, 8, 12, 13, and 14 are in the ON state. To unlock the screen, a user must change the image illustrated in 403 to "32." To do so, A gesture must be made over the appropriate objects to not only turn objects that are in the Off state to the On state that must be in the On state to form "32" but also turn objects that are in the On state to the Off state that must be in the Off state to form "32." A gesture on an object in the OFF state turns it into the ON state, while a gesture on an object in the ON state turns it into the OFF state. To change the image illustrated in 403 to "32", a gesture must be made to turn objects 2 and 13 from the ON state to the OFF state and turn objects 3, 4, 10, and 11 from the OFF state to the ON state to form "32." If this is done then the screen will unlock. In this case, a visual effect (e.g., color, light and shade, or light-emission) is temporally applied to the objects where the taps were generated, and after a lapse of a predetermined time period, the lock screen switches to the lock screen (refer to 403 of FIG. 4) of the original state.

When a touch input is detected in a confirm button 409 that is provided separately from a lock screen, the control unit 140 may determine that the tap input has been completed. When a touch input is generated in the confirm button 409, the control unit 140 recognizes an unlocking value generated in response to the tap input and determines whether or not the recognized unlocking value is identical with the predetermined unlocking value (401 of FIG. 4). If the recognized unlocking value is identical with the predetermined unlocking value, the control unit 140 unlocks the lock screen.

In contrast, if the recognized unlocking value is not identical with the predetermined unlocking value, the control unit 140 outputs an error message to the display unit 131 and controls the display unit 131 so that a lock screen in which the objects of the On state and the objects of the Off state have been randomly disposed again is displayed on the display unit 131.

Figure 5:
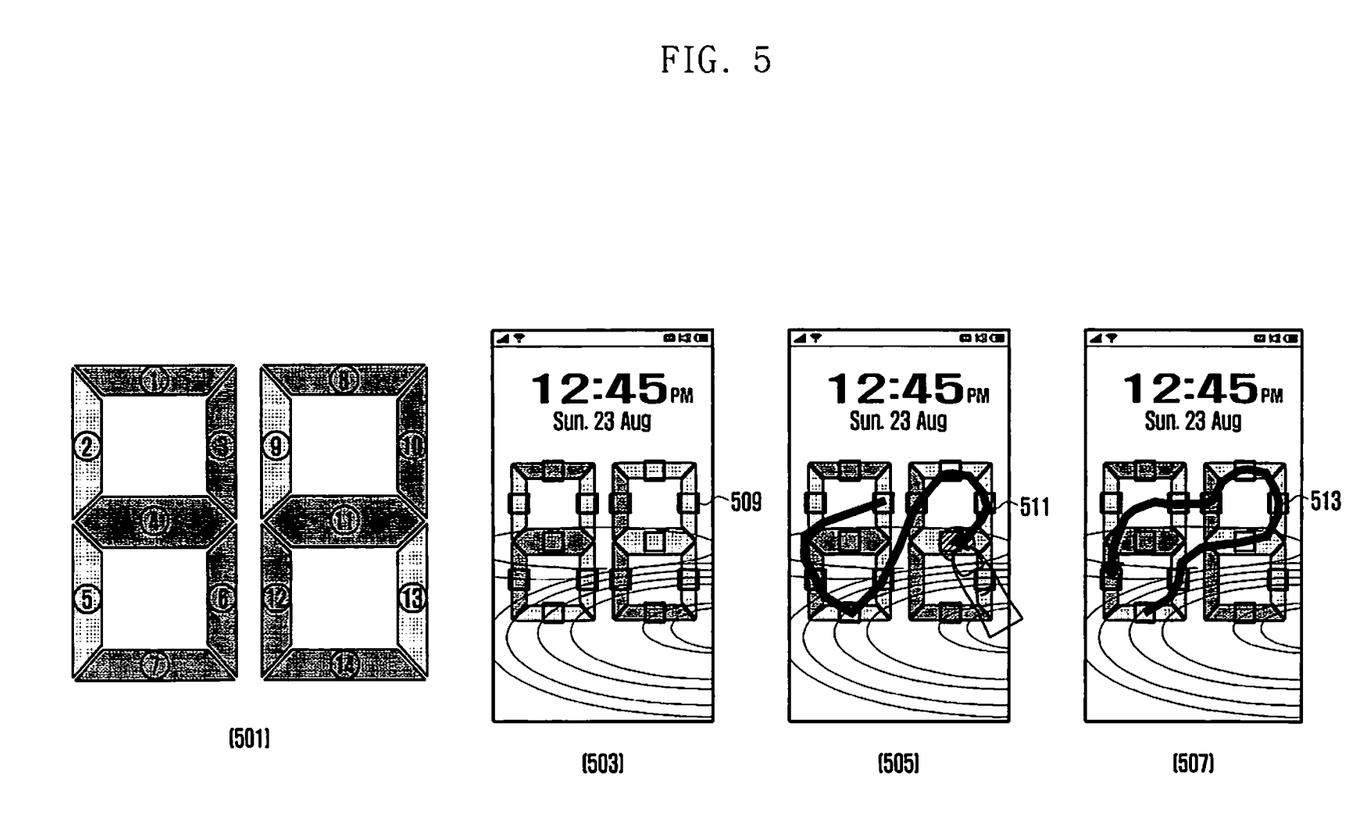
FIG. 5 is a diagram illustrating a second example of a method of processing a lock screen.

FIG. 5 is a diagram illustrating a second example of a method of processing a lock screen.

In accordance with an embodiment of the present invention, FIG. 5 shows an example of a method of processing a lock screen by inputting an unlocking value through drag on a displayed lock screen. In this case, the lock screen is a screen in which the center point of each object is set as a touch region. Furthermore, in accordance with an embodiment of the present invention, it is assumed that the lock screen includes a 7-segment of two digits and an unlocking value set by a user has the shape of numbers "32" (i.e., a shape formed by object Nos. 1, 3, 4, 6, 7, 8, 10, 11, 12, and 14 of the On state), as shown in 501 of FIG. 5. It is to be noted that the numbers indicated in the objects of FIG. 5 have been illustrated in order to describe the method of processing a lock screen, but the numbers are not displayed in actual implementations.

The control unit 140 controls the display unit 131 so that a lock screen formed of the 7-segment of two digits wherein objects of the On state and objects of the Off state have been randomly generated (i.e., object Nos. 1, 4, 5, 9, 12, and 14 of the On state) is displayed on the display unit 131, as shown in 503 of FIG. 5. Furthermore, in the 7-segment of two digits, the center point of each object is set as a touch region as indicated by 509 of FIG. 5. If the center point of the object is set as a touch region, the touch region is limited so that a touch is not generated in an unintended object when a user inputs an unlocking value through drag. That is, when the center points of objects are touched, the control unit 140 may determine that drag has occurred.

More particularly, the control unit 140 detects a drag through the touch panel 132 in the lock screen displayed on the display unit 131, such as that shown in 503 of FIG. 5. In this case, a pattern corresponding to a predetermined unlocking value is detected. For example, in order to generate an unlocking value (e.g., 501 of FIG. 5), drag that connects the center points of object Nos. 3, 5, 6, 7, 8, 9, 10, and 11 as indicated by 511 of FIG. 5 is detected in the screen 505 of FIG. 5. In this case, objects required to generate the unlocking value through the drag are the object Nos. 3, 6, 7, 9, 10, and 11, and objects not required to generate the unlocking value through the drag are the object Nos. 5 and 8. In response to the drag that connects the center points of the objects, the object Nos. 5 and 8, that is, the objects of the On state, are changed into the objects of the Off state, and the object Nos. 3, 6, 7, 9, 10, and 11, that is, the objects of the Off state, are changed into the objects of the On state. Furthermore, when the state of an object is changed (e.g., from the On state to the Off state or from the Off state to the On state or both), a visual effect is temporally applied to the objects where the drags were generated, and after a lapse of a specific time, the control unit 140 controls the display unit 131 so that the lock screen (i.e., 503 of FIG. 5) of the original state is displayed.

Furthermore, the unlocking value (refer to 501 of FIG. 5) may be completed in different order irrespective of dragged order. More particularly, the unlocking value (501 of FIG. 5) is completed in order of 3, 5, 7, 6, 9, 8, 10, and 11 as indicated by 511 in the screen 505 of FIG. 5, but may be completed in order of 7, 6, 11, 10, 8, 9, 3, and 5 as indicated by 513 in the screen 507. The order is only an example, and the present invention is not limited thereto.

As described above, since a user inputs an unlocking value in a different pattern every time, the unlocking value can be prevented from being exposed to and memorized by surrounding people. That is, unlike in the case where an existing lock screen can be easily unlocked using a simple pattern, the present invention is advantageous in that security is enhanced because a lock screen is unlocked using a different pattern every time.

Next, when the drag is released in the touch screen 130, the control unit 140 determines that the drag input has been completed. When the drag input is completed, the control unit 140 recognizes an unlocking value generated by the drag and determines whether or not the recognized unlocking value is identical with the predetermined unlocking value. If, as a result of the determination, it is determined that the recognized unlocking value is identical with the predetermined unlocking value, the control unit 140 unlocks the lock screen.

In contrast, if, as a result of the determination, it is determined that the recognized unlocking value is identical with the predetermined unlocking value, the control unit 140 outputs an error message to the display unit 131 and controls the display unit 131 so that a lock screen in which the objects of the On state have been randomly disposed again is displayed on the display unit 131.

Figure 6:
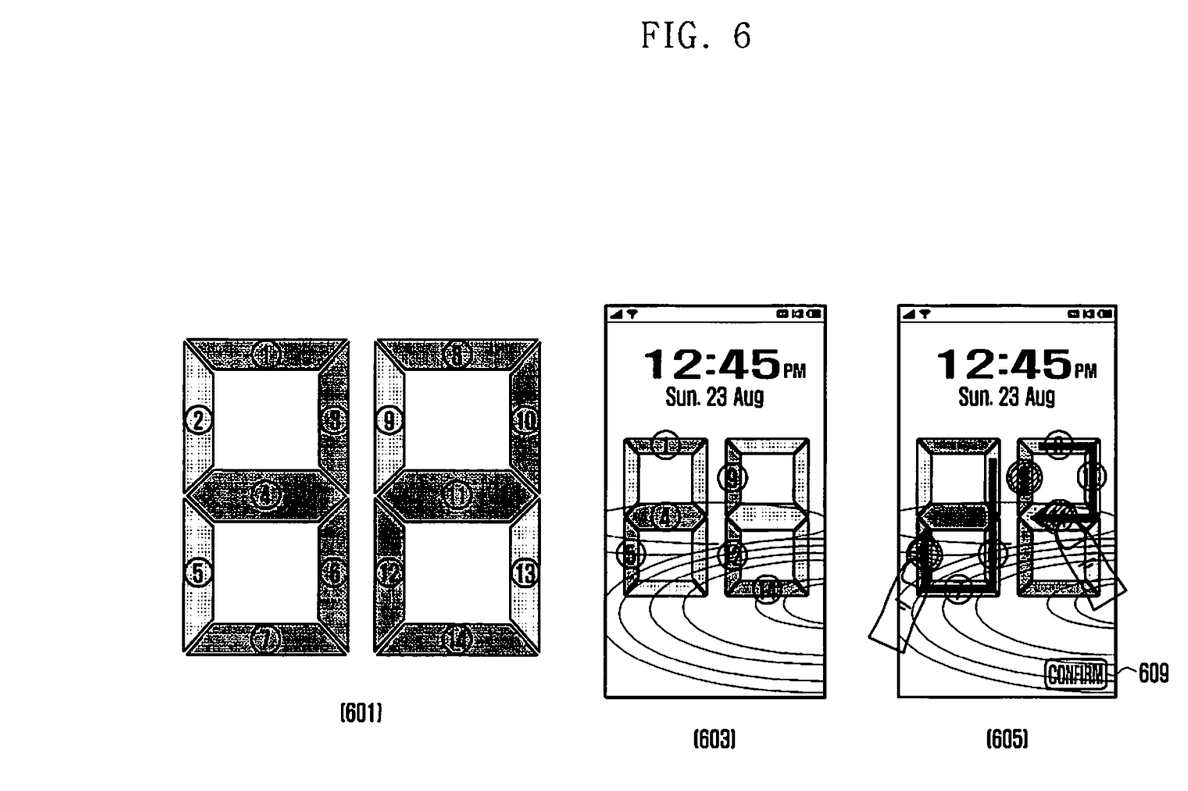
FIG. 6 is a diagram illustrating a third example of a method of processing a lock screen.

FIG. 6 is a diagram illustrating a third example of a method of processing a lock screen.

In accordance with an embodiment of the present invention, FIG. 6 shows an example of a method of processing a lock screen by inputting an unlocking value through tap or drag or both in a displayed lock screen. Furthermore, in accordance with an embodiment of the present invention, it is assumed that the lock screen includes a 7-segment of two digits and an unlocking value set by a user has the shape of numbers "32" (i.e., formed by object Nos. 1, 3, 4, 6, 7, 8, 10, 11, 12, and 14 of the On state) as shown in 601 of FIG. 6. It is to be noted that the numbers indicated in the objects of FIG. 6 have been illustrated in order to describe the method of processing a lock screen, but the numbers are not displayed in actual implementations.

The control unit 140 controls the display unit 131 so that a lock screen formed of the 7-segment of two digits wherein objects of the On state and objects of the Off state have been randomly generated is displayed on the display unit 131, as shown in 603 of FIG. 6. Furthermore, the 7-segment of two digits includes 14 objects, and the 14 objects may be differently displayed depending on the On or Off state.

The control unit 140 detects a tap input or a drag input or both for unlocking the lock screen through the touch panel 132 in the lock screen displayed on the display unit 131 as shown in 603 of FIG. 6. When the tap input or the drag input or both is generated in an object of the On state on the lock screen, the object of the On state is changed into the object of the Off state. When the tap input or the drag input or both is generated in an object of the Off state, the object of the Off state is changed into the object of the On state.

More particularly, the control unit 140 may produce the unlocking value (refer to 601 of FIG. 6) set by the user through a drag input in order of object Nos. 3, 6, 7, and 5, a drag input in order of the object Nos. 8, 10, and 11, and a tap input in object No. 9 in the lock screen (refer to 603 of FIG. 6 formed by the object Nos. 1, 4, 5, 9, 12, and 14 of the On state), as shown in 605 of FIG. 6. In this case, the objects in which the tap and drag inputs were generated, that is, the object Nos. 5 and 9 of the On state, become objects of the Off state, and the object Nos. 3, 6, 7, 8, 10, and 11 of the Off state are changed into the objects of the On state. In this case, the order is only an example, and the present invention is not limited thereto. Furthermore, when the state of the objects is changed (e.g., from the On state to the Off state or from the Off state to the On state), the control unit 140 controls the display unit 131 so that the objects where the gestures were detected are displayed on the display unit 131 by applying a visual effect to the objects. The visual effect temporally appears, and after a lapse of a specific time, the lock screen switches to the lock screen (603 of FIG. 6) of the original state. The visual effect in accordance with an embodiment of the present invention includes color, light and shade, or light-emission, but the present disclosure is not limited thereto.

When a touch input is detected in a confirm button 609 that is provided separately from the lock screen, the control unit 140 determines that the tap input and the drag input have been completed. When the touch input is generated in the confirm button 609, the control unit 140 recognizes an unlocking value generated in response to the drag and determines whether or not the recognized unlocking value is identical with the predetermined unlocking value (601 of FIG. 6). If, as a result of the determination, it is determined that the recognized unlocking value is identical with the predetermined unlocking value, the control unit 140 unlocks the lock screen.

In contrast, if, as a result of the determination, it is determined that the recognized unlocking value is not identical with the predetermined unlocking value, the control unit 140 outputs an error message to the display unit 131 and controls the display unit 131 so that a lock screen in which the objects of the On state and the objects of the Off state have been randomly disposed again is displayed on the display unit 131.

Figure 7:
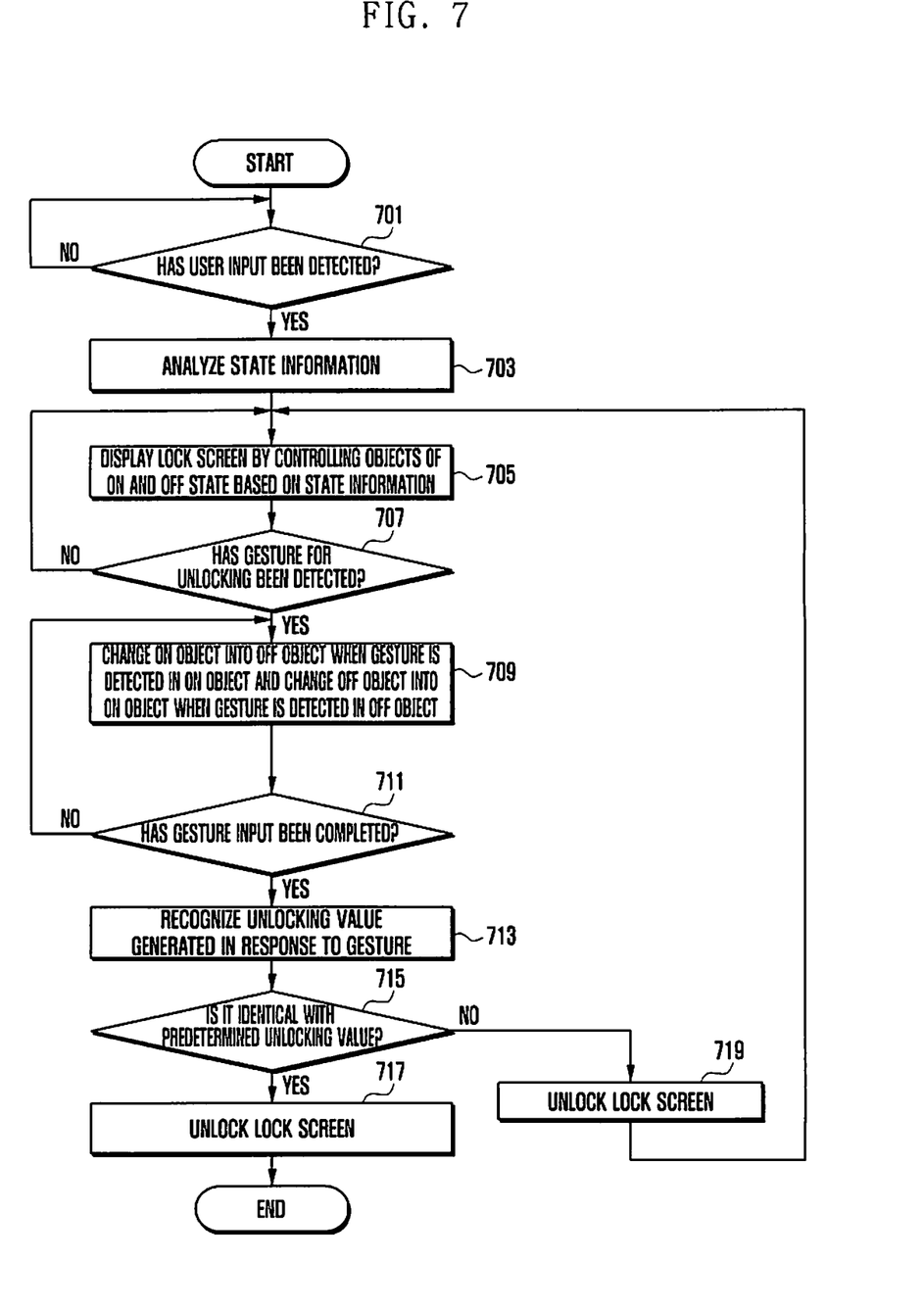
FIG. 7 is a flowchart illustrating a method of processing a lock screen based on information about the state of the electronic device in accordance with an embodiment of the present invention.
Figure 8:
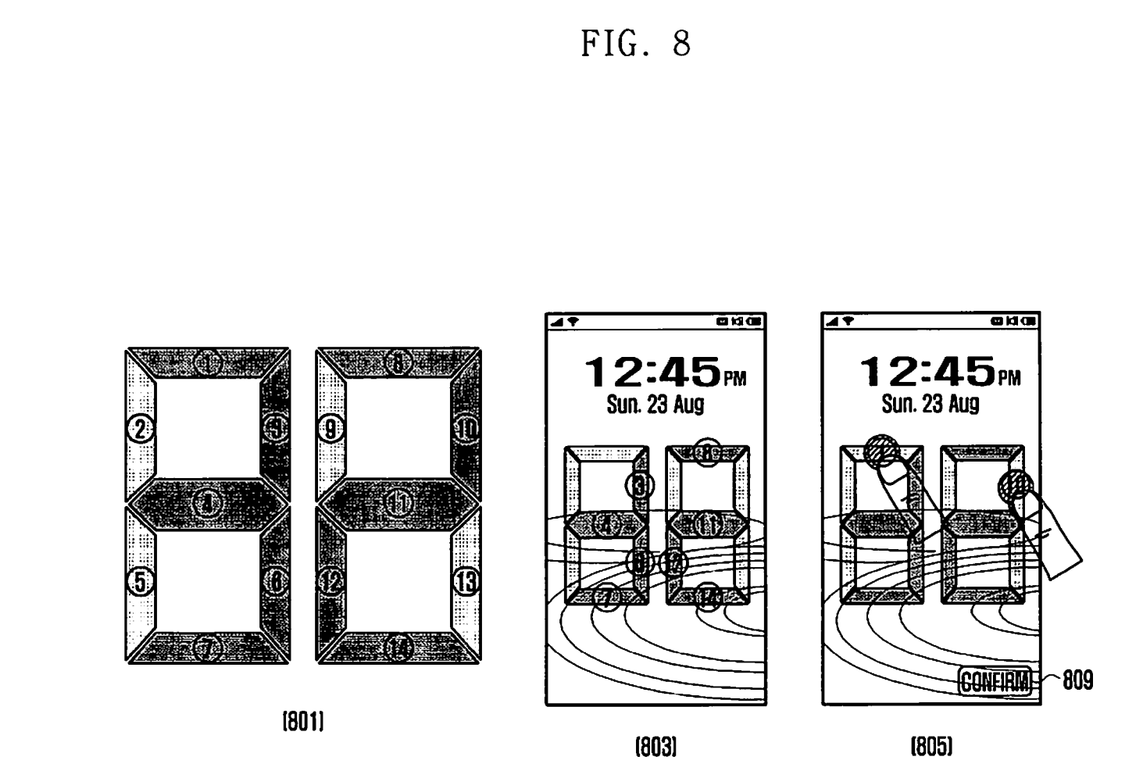
FIG. 8 is a diagram illustrating a method of processing a lock screen based on information about the state of the electronic device.

FIG. 7 is a flowchart illustrating a method of processing a lock screen based on information about the state of the electronic device in accordance with an embodiment of the present invention, and FIG. 8 is a diagram illustrating a method of processing a lock screen based on information about the state of the electronic device.

Referring to FIGS. 7 and 8, the control unit 140 is in a standby state in which a user input is detected. In the standby state, the control unit 140 detects a user input at step 701. The user input includes input generated by a hard key (e.g., a home key or a volume key). When the user input is generated, the control unit 140 detects the user input at step 701 and analyzes information about the state of the electronic device at step 703. The state information includes an elapse time until the electronic device switches from an idle state (e.g., until the display unit 131 switches from the Off state) to the On state or the importance of an application being executed before the electronic device switches to the idle state (e.g., before the display unit 131 switches to the Off state). At step 705, the control unit 140 controls the display unit 131 based on the analyzed state information so that a lock screen in which objects of the On state and objects of the Off state have been controlled (e.g., control of a level of complexity or control of a level of difficulty or both) is displayed on the display unit 131.

If it is determined that an elapse time until the electronic device switches from the idle state (e.g., until the display unit 131 switches from the Off state) to the On state is short (e.g., when the switched time from the idle state to the On state which does not exceed a predetermined time) or the importance (e.g., whether an application that required security or does not require security) of an application being executed before the electronic device switches to the idle state (e.g., before the display unit 131 switches to the Off state) is low (e.g., an application that does not require security), the control unit 140 controls the display unit 131 so that a 7-segment lock screen in which objects of the On state and objects of the Off state have been controlled like a password release value is displayed on the display unit 131.

In contrast, if it is determined that an elapse time until the electronic device switches from the idle state (e.g., until the display unit 131 switches from the Off state) to the On state is long (e.g., when the switched time from the idle state to the On state exceeds a predetermined time) or the importance of an application being executed before the electronic device switches to the idle state (e.g., before the display unit 131 switches to the Off state) is high (e.g., an application that requires security, such as an application for a message or banking), the control unit 140 may control the display unit 131 so that a 7-segment lock screen in which objects of the On state and objects of the Off state have been controlled so that it is difficult to produce a password release value is displayed.

Next, the control unit 140 determines whether or not a gesture for unlocking the lock screen is detected in the lock screen displayed on the display unit 131 at step 707. The gesture is a gesture for making an unlocking value, set by a user, identical with a shape of objects displayed as a lock screen (e.g., a shape of objects of the On state that belong to the objects of the 7-segment). In accordance with one embodiment, if an unlocking value set by a user using the 7-segment has the shape of a number "3", the user may change the state of some of the objects of the 7-segment into the On or Off state so that the 7-segment has the shape of the number "3" through a gesture (e.g., tap on each of the objects or drawing that passes through the objects) input for toggling the On or Off state of objects of the 7-segment. The gesture in accordance with an embodiment of the present invention includes a tap, drag, or tap and drag, but the present disclosure is not limited thereto.

More particularly, in accordance with an embodiment of the present invention, it is assumed that the lock screen includes a 7-segment of two digits and an unlocking value set by a user has the shape of numbers "32" (i.e., formed by object Nos. 1, 3, 4, 6, 7, 8, 10, 11, 12, and 14 of the On state) as shown in 801 of FIG. 8. It is to be noted that the numbers indicated in the objects have been illustrated in order to describe the method of processing a lock screen, but the numbers are not displayed in actual implementations.

If it is determined that an elapse time until the electronic device switches from the idle state (e.g., until the display unit 131 switches from the Off state) to the On state is short or the importance of an application being executed before the electronic device switches to the idle state (e.g., before the display unit 131 switches to the Off state) is low, the control unit 140 controls the display unit 131 so that a 7-segment lock screen in which the objects of the On state and the objects of the Off state have been controlled like an unlocking value is displayed on the display unit 131, as shown in 803 of FIG. 8. That is, the user may easily unlock the lock screen through a gesture input to the Nos. 1 and 10 objects as shown in 805 of FIG. 8 in the lock screen shown in 803 of FIG. 8.

In contrast, if it is determined that an elapse time until the electronic device switches from the idle state (e.g., until the display unit 131 switches from the Off state) to the On state is long or the importance of an application being executed before the electronic device switches to the idle state (e.g., before the display unit 131 switches to the Off state) is high (e.g., an application that requires security, such as an application for a message or banking), the control unit 140 controls the display unit 131 so that a 7-segment lock screen in which the objects of the On state and the objects of the Off state have been controlled so that it is difficult (e.g., an unlocking value generated by at least five or more tap inputs) to produce a password release value as shown in FIG. 4 is displayed on the display unit 131.

When a gesture is generated, the control unit 140 detects the gesture at step 707. At step 709, the control unit 140 changes the On state or Off state of objects where the gesture was detected based on the state of the objects and displays the objects. For example, the control unit 140 changes an object of the On state into the object of the Off state when the gesture is detected in the object of the On state and changes an object of the Off state into the object of the On state when the gesture is detected in the object of the Off state.

Furthermore, when the state of the object is changed (e.g., from the On state to the Off state or from the Off state to the On state), the control unit 140 controls the display unit 131 so that the object where the gesture was detected is displayed on the display unit 131 by applying a visual effect to the object. The user may be intuitively aware that the gesture has occurred in the object through the visual effect. The visual effect temporally appears and then switches to the lock screen of the original state. Furthermore, the visual effect in accordance with an embodiment of the present invention may be color, light and shade, or light-emission, but the present disclosure is not limited thereto.

At step 711, the control unit 140 determines whether or not the gesture input has been completed. For example, if the gesture is released from the touch panel 132 and a specific time elapses or when a touch input to a confirm button that is provided separately from the lock screen is detected, the control unit 140 detects the lapse of the specific time or the touch input at step 711 and recognizes an unlocking value generated in response to the lapse of the specific time or the touch input (i.e., a value on which an object of the On state is changed into the object of the Off state or a value on which an object of the Off state is changed into the object of the On state or both) at step 713. In accordance with one embodiment of the present invention, in a method of recognizing an unlocking value based on objects of the On state, the control unit 140 extracts only objects of the On state from the objects of the lock screen and generates an unlocking value based on the extracted objects. Furthermore, in a method of recognizing an unlocking value based on objects of the Off state, the control unit 140 extracts only objects of the Off state from the objects of the lock screen and generates an unlocking value based on the extracted objects.

At step 715, the control unit 140 determines whether or not the recognized unlocking value (i.e., the unlocking value generated in response to the gesture) is identical with a predetermined unlocking value. If, as a result of the determination, it is determined that the recognized unlocking value is identical with the predetermined unlocking value, the control unit 140 unlocks the lock screen at step 717.

In contrast, if, as a result of the determination, it is determined that the recognized unlocking value is not identical with the predetermined unlocking value, the control unit 140 outputs an error message to the display unit 131 at step 719 and controls the display unit 131 so that a lock screen in which the objects of the On state and the objects of the Off state have been randomly disposed again is displayed on the display unit 131.

As described above, in the electronic device according to various embodiments of the present invention, a user can unlock a lock screen through a gesture having a different pattern every time in a lock screen having a different shape every time. Accordingly, there is an advantage in that security can be enhanced because an unlocking value set by a user is prevented from being exposed to surrounding people.

Furthermore, the present invention is advantageous in that an intuitive user interface can be supported by temporally applying a visual effect when inputting a gesture for unlocking a lock screen.

The method and apparatus for processing a lock screen in an electronic device in accordance with some embodiments of the present invention have been described above through the specification and drawings. Although specific terms are used, the terms are merely used according to their common meanings in order to easily describe the technical contents of the present invention and help understanding of the present invention, and the present invention is not limited to the aforementioned embodiments of the present invention. That is, it will be evident to those skilled in the art that various embodiments can be implemented without departing from the technical spirit and scope of the present invention, as defined by the appended claims and their equivalents.

What is claimed is:

1. A method of unlocking a lock screen in an electronic device, comprising steps of:
    displaying a lock screen comprising a plurality of objects that are each automatically, randomly displayed in a first state or a second state each time the lock screen is displayed, wherein at least one of the plurality of objects is randomly displayed in the first state and at least another one of the plurality of objects is randomly displayed in the second state;
    detecting a gesture for changing a state of at least one of the plurality of objects;
    generating a first unlocking value formed by objects in the second state, in response to the gesture;
    determining whether the first unlocking value is identical with a second unlocking value; and
    unlocking the lock screen, when the first unlocking value is identical with the second unlocking value.

2. The method of claim 1, further comprising outputting an error message when the first unlocking value is not identical with the second unlocking value, and randomly displaying again the first state or the second state of the plurality of objects in the lock screen.

3. The method of claim 1, wherein the gesture includes at least one of a tap, drag, and tap and drag.

4. The method of claim 3, wherein when the gesture is the drag, a center point of each object is set as a touch region.

5. The method of claim 1, wherein detecting the gesture comprises changing and displaying the first state or the second state of an object where the gesture has been detected.

6. The method of claim 5, wherein changing and displaying the first state or the second state of the object comprises changing and displaying the first state or the second state of the object with a visual effect temporally, and wherein the visual effect includes at least one of color, light and shade, and light-emission.

7. A method for processing a lock screen in an electronic device, comprising steps of:
    detecting a user input;
    analyzing state information of the electronic device in response to the user input;
    displaying a lock screen comprising a plurality of objects based on the analyzed state information, wherein each of the plurality of objects are automatically, randomly displayed in a first state or second state each time the lock screen is displayed, and wherein at least one of the plurality of objects is randomly displayed in the first state and at least another one of the plurality of objects is randomly displayed in the second state;
    detecting a gesture for changing a state of at least one of the plurality of objects;
    generating a first unlocking value formed by objects in the second state, in response to the gesture;
    determining whether the first unlocking value is identical with a second unlocking value; and
    unlocking the lock screen, when the first unlocking value is identical with the second unlocking value.

8. The method of claim 7, wherein the state information comprises any one of an elapsed time for the electronic device to switch from an idle state to an On state, and whether an application being executed requires security before the electronic device switches to the idle state.

9. The method of claim 7, wherein displaying the lock screen comprises:
    displaying a lock screen comprising the plurality of objects that are randomly displayed in the first state or the second state in order to display a first incomplete value requiring one or two tap inputs to be identical to the second unlocking value, when an elapsed time for the electronic device to switch from an idle state to an On state does not exceed a predetermined time or whether an application does not require security; and
    displaying a lock screen comprising the plurality of objects that are randomly displayed in the first state or the second state in order to display a second incomplete value requiring at least five tap inputs to be identical to the second unlocking value, when the elapsed time for the electronic device to switch from the idle state to the On state exceeds the predetermined time or the application requires security.

10. An apparatus for processing a lock screen in an electronic device, comprising:
    a touch screen configured to display a lock screen comprising a plurality of objects that are each automatically, randomly displayed in a first state or a second state each time the lock screen is displayed, wherein at least one of the plurality of objects is randomly displayed in the first state and at least another one of the plurality of objects is randomly displayed in the second state; and
    a processor configured to
        control the touch screen to display the lock screen comprising the plurality of objects randomly displayed in the first state or the second state,
        detect a gesture for changing a state of at least one of the plurality of objects,
        generate a first unlocking value formed by objects in the second state, in response to the gesture,
        determine whether the first unlocking value is identical with a second unlocking value, and
        unlock the lock screen, when the first unlocking value is identical with the second unlocking value.

11. The apparatus of claim 10, wherein when the first unlocking value is not identical with the second unlocking value, the processor outputs an error message to the touch screen and controls the touch screen to display a lock screen in which the first state or the second state of the plurality of objects have been randomly displayed again.

12. The apparatus of claim 10, wherein when the gesture is detected, the processor changes the first state or the second state of an object where the gesture has been generated and controls the touch screen to display the object of the changed first state or the changed second state.

13. The apparatus of claim 10, wherein the processor detects a user input, analyzes state information of the electronic device in response to the user input, controls the touch screen to display the lock screen comprising the plurality of objects that are randomly activated in the first state or the second state based on the analyzed state information.

14. The apparatus of claim 13, wherein the processor sets any one of an elapsed time for the electronic device to switch from an idle state to an On state and whether an application being executed requires security, before the electronic device switches to the idle state as the state information.

15. The apparatus of claim 13, wherein the processor controls the touch screen to display the lock screen comprising the plurality of objects that are randomly displayed in the first state or the second state in order to display a first incomplete value requiring one or two tap inputs to be identical to the second unlocking value, when an elapsed time for the electronic device to switch from an idle state to an On state does not exceed a predetermined time or an application does not require security, and wherein the processor controls the touch screen to display the lock screen comprising the plurality of objects that are randomly displayed in the first state or the second state in order to display a second incomplete value requiring at least five tap inputs to be identical to the second unlocking value, when the elapsed time for the electronic device to switch from the idle state to the On state exceeds the predetermined time or the application requires security.

* * * * *